United States Patent
Priyadarshi et al.

(10) Patent No.: US 12,311,968 B2
(45) Date of Patent: May 27, 2025

(54) SECURITY SYSTEMS FOR MACHINE LEARNING MODELS

(71) Applicant: QUALCOMM Incorporated, San Diego, CA (US)

(72) Inventors: Sweta Priyadarshi, San Diego, CA (US); Shivansh Rao, San Diego, CA (US); Varun Ravi Kumar, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 18/329,416

(22) Filed: Jun. 5, 2023

(65) Prior Publication Data

US 2024/0400079 A1    Dec. 5, 2024

(51) Int. Cl.
*B60W 50/14* (2020.01)
*G06T 7/00* (2017.01)

(52) U.S. Cl.
CPC .............. *B60W 50/14* (2013.01); *G06T 7/97* (2017.01); *G06T 2207/20081* (2013.01); *G06T 2207/20221* (2013.01)

(58) Field of Classification Search
CPC .............. B60W 50/14; G06T 7/97; G06T 2207/20081; G06T 2207/20221; G06T 2207/10028; G06T 5/50; G06T 2207/20084
See application file for complete search history.

(56) References Cited

U.S. PATENT DOCUMENTS

| | | | |
|---|---|---|---|
| 11,214,268 B2* | 1/2022 | Gonzalez Aguirre | G05B 23/024 |
| 11,686,848 B2* | 6/2023 | Tu | G06F 18/217 702/152 |
| 2020/0284883 A1* | 9/2020 | Ferreira | G01S 7/4815 |
| 2020/0326667 A1* | 10/2020 | Ahuja | G06N 3/047 |
| 2022/0101046 A1* | 3/2022 | Lin | G06V 10/82 |
| 2022/0108604 A1* | 4/2022 | Duggal | G08G 1/0133 |
| 2024/0182071 A1* | 6/2024 | Jafari Tafti | B60W 60/00188 |

OTHER PUBLICATIONS

Gu J., et al., "Are Vision Transformers Robust to Patch Perturbations?", European Conference on Computer Vision (ECCV), 2022, arXiv:2111.10659v2 [cs.CV] Jul. 18, 2022, pp. 1-39.

Tu J., et al., "Exploring Adversarial Robustness of Multi-Sensor Perception Systems in Self Driving", Computer Vision and Pattern Recognition (cs.CV); Machine Learning (cs.LG), arXiv:2101.06784v3 [cs.CV] Jan. 7, 2022, pp. 1-12.

* cited by examiner

Primary Examiner — Sizo B Vilakazi
(74) Attorney, Agent, or Firm — Qualcomm/Norton Rose Fulbright US LLP

(57) ABSTRACT

This disclosure provides systems, methods, and devices for vehicle driving assistance systems that support image processing. In a first aspect, a method of image processing includes receiving, by a processor, image data from a camera image sensor; receiving, by the processor, point cloud data from a light detection and ranging (LiDAR) sensor; generating, by the processor and using a first machine learning model, fused image data that combines the image data and the point cloud data; and determining, by the processor and using a second machine learning model, whether the fused image data satisfies a criteria based on whether a population risk function of the first machine learning model exceeds a threshold. Other aspects and features are also claimed and described.

30 Claims, 7 Drawing Sheets

SECURITY SYSTEMS FOR MACHINE LEARNING MODELS

TECHNICAL FIELD

Aspects of the present disclosure relate generally to machine learning, and more particularly, to methods and systems suitable for supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure provide improved systems for assisting drivers in vehicles with enhanced situational awareness when driving on a road.

Example embodiments provide security techniques for detecting whether data collected by, or provided to, a driving assistance system may have been compromised, such as by an adversarial attack. Deep learning models (e.g., deep neural networks) are important for multiple perception tasks for autonomous vehicles, such as object detection, semantic segmentation, and depth estimation. Deep learning models, however, can be misled by white box or black box adversarial attacks, which can have significant consequences in safety-critical applications of deep learning models for autonomous vehicles. For instance, while multimodal sensor fusion systems have significantly improved performance of object detection, classification, and segmentation tasks, multimodal sensor fusion systems are vulnerable to adversarial attacks due to their increased model complexity and multiple adversarial attack pathways (e.g., image data, point cloud data, etc.). In one example, a deep learning model of a driving assistance system could be misled by an adversarial attack to detect that a traffic light is green when the traffic light is actually red. Such an adversarial attack causes the autonomous vehicle to drive through a red light. In at least some embodiments, the provided security techniques are implemented with a camera-light detection and ranging (LiDAR) fusion system.

In at least some embodiments of this disclosure, a first machine learning model of the provided systems determines fused data that combines input data from sensors of the multimodal sensor fusion system. A second machine learning model is trained to detect artificial data noise that is associated with an adversarial attack as part of a first security technique. To detect the artificial data noise, the second machine learning model of the first security technique may be trained to include weights that minimize a population risk function of the first machine learning model when artificial data noise is added to the weights. The population risk function includes a sum of the loss functions of the point cloud data and the image data. In this way, the second machine learning model learns what range of artificial data noise is associated with an adversarial attack. In some embodiments, a machine learning model may be implemented as a neural network or as a layer of a neural network. For example, the first and second machine learning models may be implemented as two separate neural networks or as two layers of the same neural network.

The second machine learning model is applied to the data prior to providing the data to a function of an autonomous vehicle. The output of the second machine learning model may be used to prevent compromised data from negatively affecting the function of the autonomous vehicle. The second machine learning model detects the compromised data (such as by identifying artificial data noise) and triggers discarding the data and/or disabling the function of the autonomous vehicle that relies on the data, such as disabling autopilot.

In some embodiments of this disclosure, a second security technique may be used to further protect the vehicle systems from compromised data. The second security technique may separate image data into multiple patches prior to camera-LiDAR fusion. Each of the patches are embedded with positional information. Additionally or alternatively, the LiDAR point cloud data may be divided into patches for separate processing. Separating the image and/or point cloud data into patches increases the difficulty for an adversarial attacker to compromise the image modality and/or point cloud modality because the information of the image data and/or point cloud data is distributed over multiple patches along with positional encodings.

In some embodiments of this disclosure, a third security technique may be used to further protect the vehicle systems from compromised data in combination with one or both of the first security technique and the second security technique. The third security technique may fuse extracted features of the LiDAR point cloud data and extracted features of the camera image data (instead of raw point cloud and image data) using a transformer that executes a cross-attention process. The use of the cross-attention process to obtain a multi-modal representation of a scene provides context for authenticating what is represented by the point cloud data or image data by ensuring that what is shown in the point cloud data is shown in the image data, and vice versa. The use of the cross-attention process additionally enables the sharing of information between the LiDAR and camera modalities to limit or prevent the effectiveness of adversarial attacks on either the LiDAR modality or camera modality individually.

In one aspect of the disclosure, a method for image processing for use in a vehicle assistance system includes receiving image data from a camera image sensor; receiving point cloud data from a light detection and ranging (LiDAR) sensor; generating, using a first machine learning model, fused image data that combines the image data and the point cloud data; and determining, using a second machine learning model, whether the fused image data satisfies a criteria based on whether a population risk function of the first machine learning model exceeds a threshold.

In an additional aspect of the disclosure, an apparatus includes at least one processor and a memory coupled to the at least one processor. The at least one processor is configured to perform operations including receiving image data from a camera image sensor; receiving point cloud data from a light detection and ranging (LiDAR) sensor; generating, using a first machine learning model, fused image data that combines the image data and the point cloud data; and determining, using a second machine learning model, whether the fused image data satisfies a criteria based on whether a population risk function of the first machine learning model exceeds a threshold.

In an additional aspect of the disclosure, a method for training a machine learning model for use in a vehicle assistance system includes receiving fused image data determined by a first machine learning model, and adding artificial data noise to a plurality of weights of a second machine learning model. The fused image data combines a first plurality of features of point cloud data and a second plurality of features of image data. The second machine learning model includes a population risk function of the first machine learning model. The method for training further includes adjusting the plurality of weights of the second machine learning model in response to the artificial data noise causing an increase in an output of the population risk function of the first machine learning model, thereby training the second machine learning model to minimize the population risk function when the population risk function includes an artificial data noise.

In an additional aspect of the disclosure, an apparatus includes at least one processor and a memory coupled to the at least one processor. The at least one processor is configured to perform operations including receiving fused image data determined by a first machine learning model, and adding artificial data noise to a plurality of weights of a second machine learning model. The fused image data combines a first plurality of features of point cloud data and a second plurality of features of image data. The second machine learning model includes a population risk function of the first machine learning model. The method for training further includes adjusting the plurality of weights of the second machine learning model in response to the artificial data noise causing an increase in an output of the population risk function of the first machine learning model, thereby training the second machine learning model to minimize the population risk function when the population risk function includes an artificial data noise.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description and not as a definition of the limits of the claims.

In various implementations, the techniques and apparatus may be used for wireless communication networks, such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example, implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE together with the network that joins the base stations (for example, the Ater and Abis interfaces) and the base station controllers (A interfaces, etc.). The radio access network represents a component of a GSM network through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks or one or more other networks. The various different network types may use different radio access technologies (RATs) and RANs.

An OFDMA network may implement a radio technology, such as evolved UTRA (E-UTRA), Institute of Electrical and Electronics Engineers (IEEE) 802.11, IEEE 802.16, IEEE 802.20, flash-OFDM, and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS, and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR, two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles despite being different from the extremely high frequency (EHF) band (30 GHZ-300 GHz), which is identified by the International Telecommunications Union (ITU) as a "mm Wave" band.

With the above aspects in mind, unless specifically stated otherwise, it should be understood that the term "sub-6 GHz", or the like if used herein, may broadly represent frequencies that may be less than 6 GHz, may be within FR1, or may include mid-band frequencies. Further, unless specifically stated otherwise, it should be understood that the term "mmWave", or the like if used herein, may broadly represent frequencies that may include mid-band frequencies, may be within FR2 or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz; for example over 1, 5, 10, 20 MHZ, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum, depending on loading and availability. Accordingly, it will be apparent to a person having ordinary skill in the art that the systems, apparatus, and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description, and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise, as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating", or the like, refer to the actions and processes of a computer system or similar electronic computing device that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
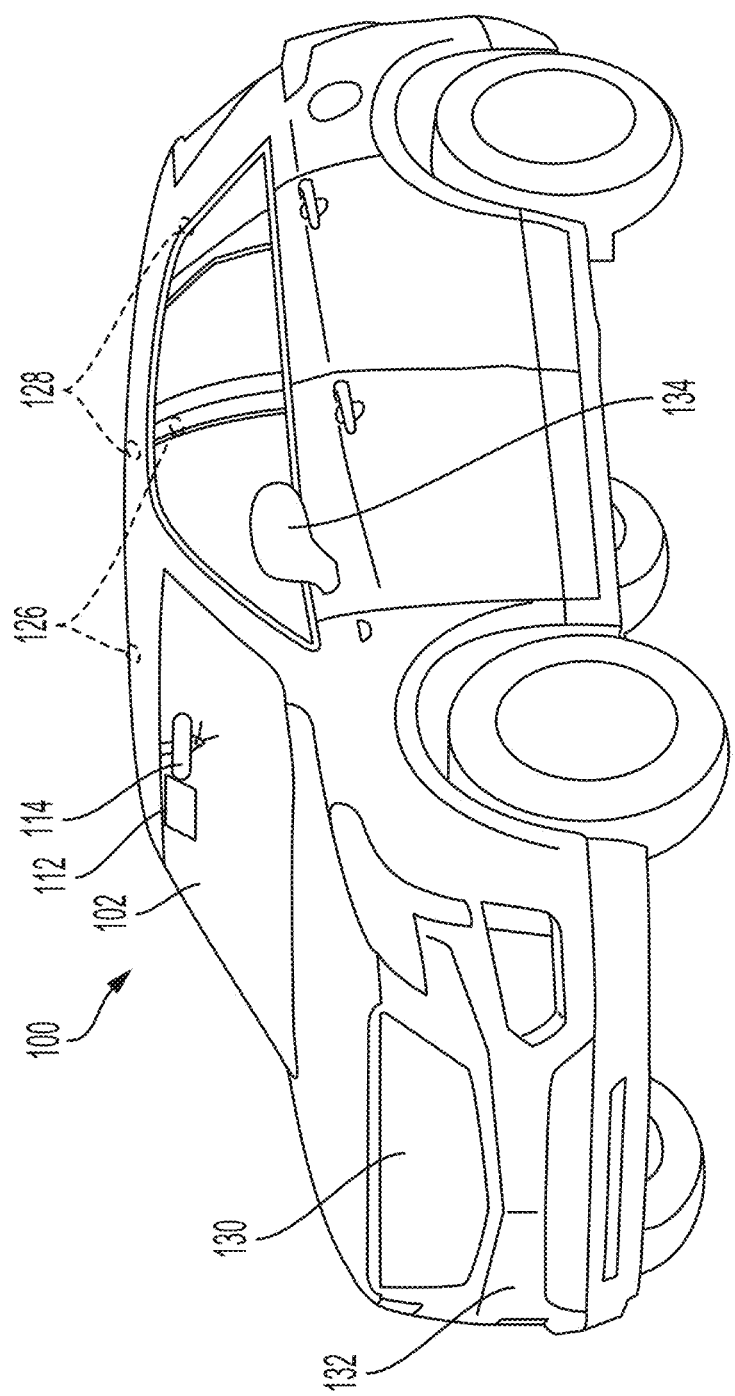
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support detecting when data collected by, or provided to, a driving assistance system may have been compromised (e.g., altered), such as by an adversarial attack. Deep learning models (e.g., deep neural networks) are important for perception tasks for autonomous vehicles, such as object detection, semantic segmentation, depth estimation, etc. For instance, multimodal sensor fusion systems have significantly improved performance of object detection, classification, and segmentation tasks. Deep learning models, however, can be misled by white box or black box adversarial attacks, which can have significant consequences in the safety-critical applications of deep learning models for autonomous vehicles. In white box attacks, an adversarial attacker has access to a targeted deep learning model including learned weights and parameters used to tune the model. Conversely, in black box attacks, an adversarial attacker has limited knowledge of the targeted deep learning model and only has access to the deployed deep learning model. As such, it is more difficult to defend against a white box attack than a black box attack because while black box attacks are primarily on the final deployed model with little to no information about model weights and the model's tunable parameters, white box attacks have access to the model's learned weights and can be formulated based on the learned weight's perturbation. Multi-modal sensor fusion systems are particularly vulnerable to adversarial attacks due to their increased model complexity and multiple adversarial attack pathways (e.g., image data, point cloud data, etc.). In one example, a deep learning model of a driving assistance system could be misled by an adversarial attack to detect that a traffic light is green when the traffic light is actually red, and therefore the adversarial attack causes the autonomous vehicle to drive through a red light.

Embodiments of the present disclosure provide security techniques for helping prevent (e.g., increasing the difficulty of) adversarial attacks from compromising a multimodal sensor fusion system (e.g., a camera and LiDAR fusion system), and for predicting (e.g., detecting) whether the multimodal sensor fusion system may have been compromised by an adversarial attack. A first machine learning model determines fused data that combines input data from sensors of the multimodal sensor fusion system. In some embodiments of this disclosure, a second machine learning model is trained to detect artificial data noise that is associated with an adversarial attack as part of a first security technique. Artificial data noise as used herein is a distribution function that is learned and then associated with an adversarial attack. For example, in a Project Gradient Descent (PGD) attack, which is one example of a white box attack, an adversarial attacker attempts to find the perturbation on the input that maximizes the loss of a model while minimizing the size of the perturbation. Stated differently, the adversarial attacker attempts to maximize a population risk function of the model. In the example of a camera and LiDAR fusion system, the adversarial attacker attempts to maximize a sum of a loss function of the point cloud data and a loss function of the image data in a PGD attack by introducing artificial data noise.

To combat such an attack as well as other types of black box or white box attacks, the second machine learning model of the first security technique is trained to include weights that minimize a population risk function of the first machine learning model when artificial data noise is added to the weights. The population risk function includes a sum of the loss functions of the point cloud data and the image data. In this way, the second machine learning model learns what range of artificial data noise is associated with an adversarial attack. For example, if the sum of the loss functions of the point cloud data and the image data in the presence of artificial data noise is greater than a threshold value, then the artificial data noise is learned to be associated with an adversarial attack. The machine learning model is implemented prior to the data being provided to a function of an autonomous vehicle, and thus serves as a gatekeeper that prevents compromised data from negatively affecting the function of the autonomous vehicle. The machine learning model detecting artificial data noise learned to be associated with an adversarial attack can trigger discarding the data and/or disabling the function of the autonomous vehicle that relies on the data, such as disabling autopilot.

In some embodiments of this disclosure, a second security technique includes utilizing a transformer that separates image data and/or LiDAR point cloud data into multiple patches prior to camera-LiDAR fusion. Each of the patches are embedded with positional information. For example, multi-head attention may be applied to each of the patches to store positional information of the patches with respect to one another, along with each of the patches' importance in identifying which patch affects the identification of other patches. Multi-head attention is a technique that runs through an attention mechanism several times in parallel (e.g., for each patch). The independent attention outputs (e.g., for each patch) are then concatenated and linearly transformed into the expected dimension. Multi-head attention allows an attention function to extract information from the different patches, which would otherwise be impossible with a single attention head. Separating the image data into patches in this way increases the difficulty for an adversarial attacker to compromise the image modality, because the information of the image data is distributed over multiple patches along with positional encodings.

In some embodiments of this disclosure, a third security technique includes fusing extracted features of the lidar point cloud data and extracted features of the camera image data, instead of raw point cloud and image data, using a transformer that executes cross-attention. Cross-attention is a fusion method in which attention masks from one modality (e.g., LiDAR point cloud data) are used to highlight the extracted features in another modality (e.g., camera image data). Stated differently, cross-attention is a mechanism in which one modality (e.g., LiDAR point cloud data) is queried and a key and value pair from another modality (e.g., camera image data) is provided. In this way, a key, value, and query pairing associates one modality with another modality. As such, the use of cross-attention provides context for authenticating what is represented by the point cloud data or image data by ensuring that what is shown in the point cloud data is shown in the image data, and vice versa. The use of cross-attention additionally enables the sharing of information between the LiDAR and camera modalities to limit or prevent the effectiveness of adversarial attacks on either the LiDAR modality or camera modality individually.

As part of the third security technique, a 3D reference point of the LiDAR point cloud data is projected into the Bird's Eye View (BEV) plane and projected features of the LiDAR point cloud data are obtained, which can be used to obtain index (e.g., global) features. The index features can be used to obtain cross-attention features, which store information about surrounding features in the LiDAR point cloud data and their importance in the LiDAR point cloud space. The cross-attention involves a query from the LiDAR point cloud data and a key and value from the camera image data. A local feature importance value (e.g., weighting value) is associated with each of the cross-attention features of the LiDAR point cloud data based on an overlap of a feature (e.g., patch) of the image data with the cross-attention features of the point cloud data, which is repeated for each feature of the image data. The extracted features of the point cloud data are then fused with the extracted features of the image data in latent space with the associated local feature importance values. In at least some embodiments, the fused features along with the associated local feature importance values may be supplied to the second machine learning model of the first security technique.

Particular implementations of the subject matter described in this disclosure may be implemented to realize one or more of the following potential advantages or benefits. In some aspects, the present disclosure provides techniques for image processing that may be particularly beneficial in smart vehicle applications. For example, the provided security techniques detect when data from a camera or LiDAR system may have been compromised so that a function of an autonomous vehicle receiving that data may be disabled in order to prevent safety-critical data processing errors due to an adversarial attack. In various embodiments, the security techniques include a model trained to detect artificial data noise associated with an adversarial attack such that an adversarial attack can be detected. In various embodiments, the security techniques are more robust against changes made to raw data (e.g., raw image data or raw point cloud data) by an adversarial attack because the raw image data is split into multiple patches embedded with positional information, which makes it challenging to alter the image modality since the image data is distributed over multiple patches. In various embodiments, the security techniques are more robust against changes made to raw data by an adversarial attack because extracted features of each of the image data and the point cloud data are fused rather than the raw data itself. In such embodiments, cross-attention may be utilized to correlate features between the image data and the point cloud data by weighted importance scores and embedded positional information, which lessens the impact of white box attacks.

As used herein, an adversarial attacker is any individual or machine (e.g., computing device) that attempts to trick a machine learning model into making false predictions (e.g., an adversarial attack) by slightly modifying the input. Typically, the input modifications are imperceptible and/or insignificant to humans, ranging from color change of one pixel to images looking like overly compressed JPEGs.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular, the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
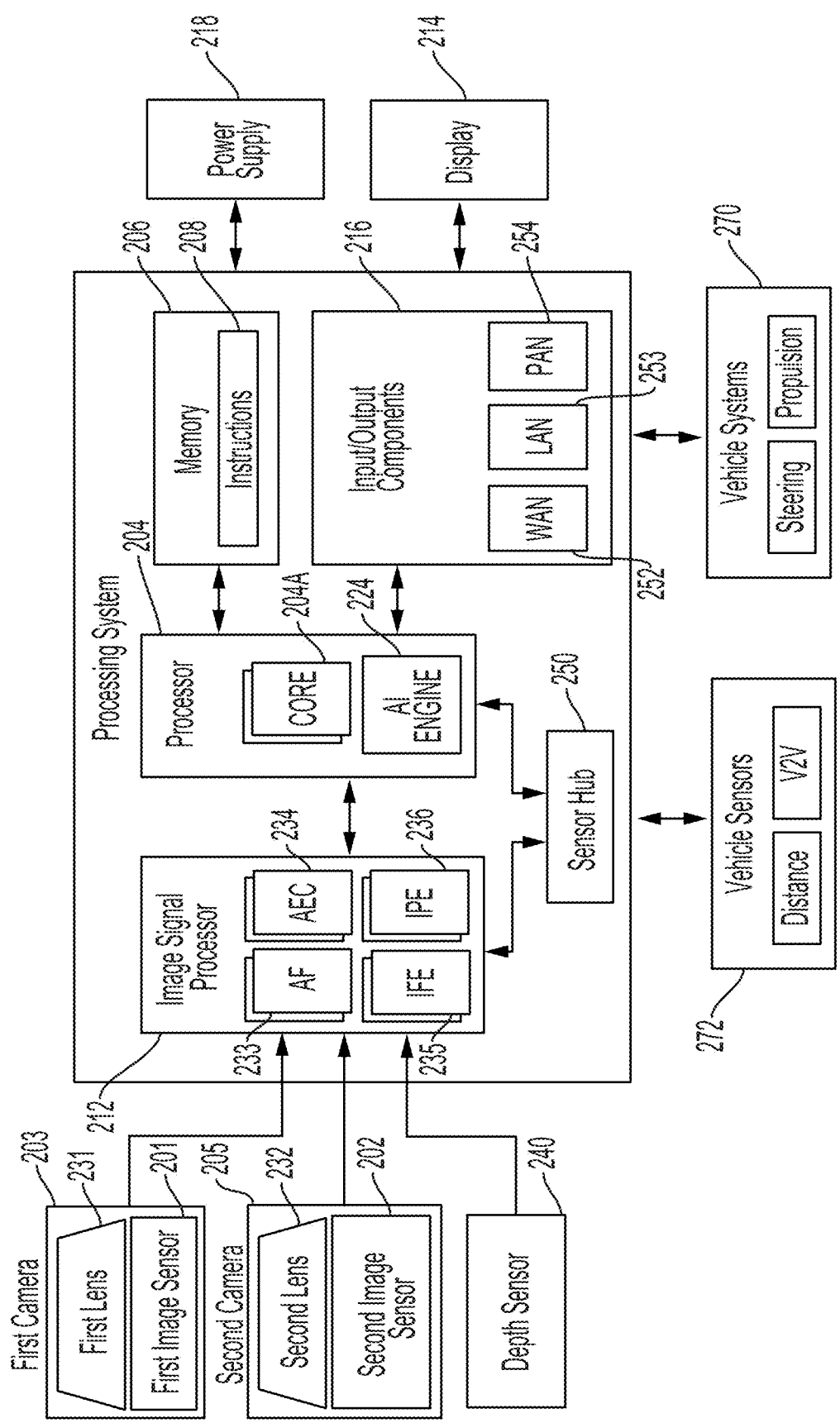
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include, or be coupled to, a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination). The output of commands to the vehicle systems 270 may be protected from malicious data according to embodiments of this disclosure by using machine learning models, such as described in FIGS. 4-7, to eliminate suspect data that can affect the commands sent to the vehicle system 270.

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
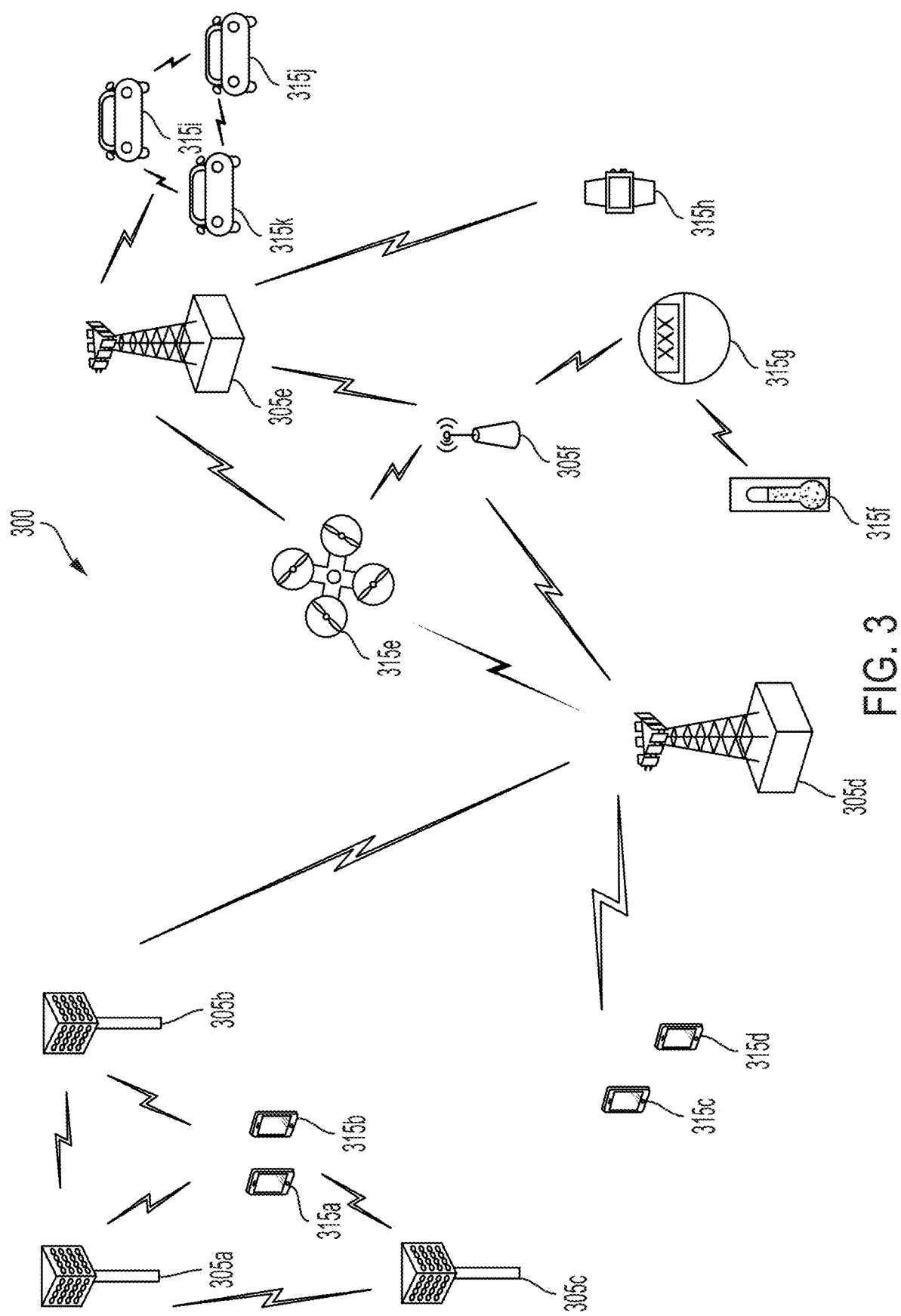
FIG. 3 is a block diagram illustrating details of an example wireless communication system according to one or more aspects of the disclosure.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305d and 305e are regular macro base stations, while base stations 305a-305c are macro base stations enabled with one of three-dimension (3D), full dimension (FD), or massive MIMO. Base stations 305a-305c take advantage of their higher dimension MIMO capabilities to exploit 3D beamforming in both elevation and azimuth beamforming to increase coverage and capacity. Base station 305f is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus may include implementations of one or more of UEs 315, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315a-j are specifically shown as vehicles, a vehicle may employ the communication configuration described with reference to any of the UEs 315a-315k.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315a-315d of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT), and the like. UEs 315e-315k illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305a-305c serve UEs 315a and 315b using 3D beamforming and coordinated spatial techniques, such as coordinated multipoint (CoMP) or multi-connectivity. Macro base station 305d performs backhaul communications with base stations 305a-305c, as well as small cell, base station 305f. Macro base station 305d also transmits multicast services which are subscribed to and received by UEs 315c and 315d. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315e, which is a drone. Redundant communication links with UE 315e include from macro base stations 305d and 305e, as well as small cell base station 305f. Other machine type devices, such as UE 315f (thermometer), UE 315g (smart meter), and UE 315h (wearable device) may communicate through wireless network 300 either directly with base stations, such as small cell base station 305f, and macro base station 305e, or in multi-hop configurations by communicating with another user device which relays its information to the network, such as UE 315f communicating temperature measurement information to the smart meter, UE 315g, which is then reported to the network through small cell base station 305f. Wireless network 300 may also provide additional network efficiency through dynamic, low-latency TDD communications or low-latency FDD communications, such as in a vehicle-to-vehicle (V2V) mesh network between UEs 315i-315k communicating with macro base station 305c.

Aspects of the vehicular systems described with reference to, and shown in, FIG. 1, FIG. 2, and FIG. 3 may include security techniques for helping prevent (e.g., increasing the difficulty of) adversarial attacks from compromising a multimodal sensor fusion system (e.g., a camera and LiDAR fusion system), and for predicting (e.g., detecting) when the multimodal sensor fusion system may have been compromised by an adversarial attack. A first machine learning model (or layer of a machine learning model) determines fused data that combines input data from a camera image sensor and input data from a light detecting and ranging (LiDAR) sensor. In some embodiments, a first security technique includes a second machine learning model (or another layer of the machine learning model) that is trained to detect artificial data noise that is associated with an adversarial attack. To do so, the second machine learning model is trained to minimize a population risk function of the first machine learning model. In some embodiments, a second security technique includes utilizing a transformer that separates image data into multiple patches prior to camera-LiDAR fusion, which increases the difficulty for an adversarial attacker to compromise the image modality because the information of the image data is distributed over multiple patches along with positional encodings. In some embodiments, a third security technique includes fusing extracted features of the lidar point cloud data and extracted features of the camera image data, instead of raw point cloud and image data, using a transformer that executes a cross-attention process. The use of cross-attention enables the sharing of information between the LiDAR and camera modalities to limit or prevent the effectiveness of adversarial attacks on either the LiDAR modality or camera modality individually.

Figure 4:
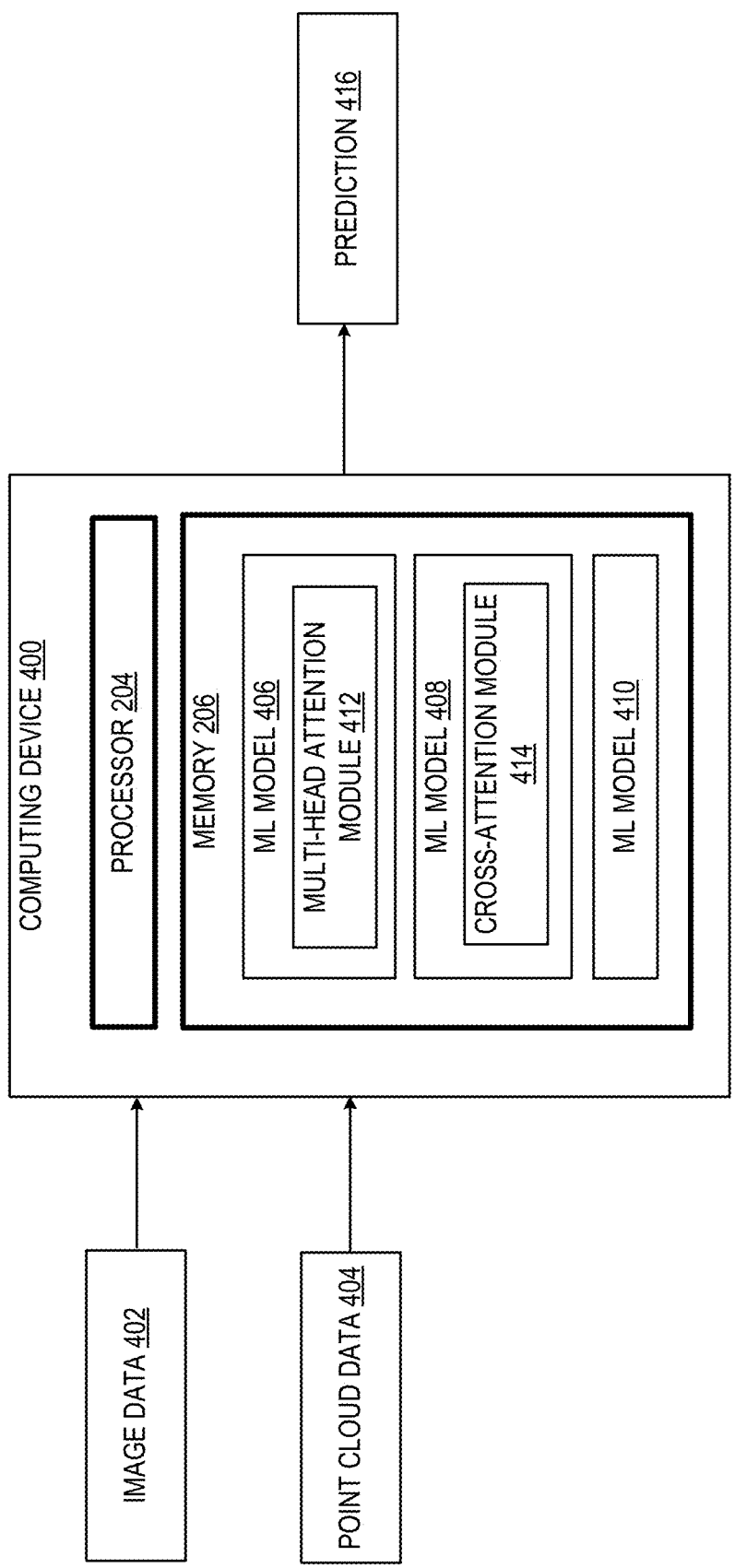
FIG. 4 is a block diagram of computing device that determines a prediction of whether fused data combining image data and point cloud data is compromised by an adversarial attack according to one or more aspects of the disclosure.

FIG. 4 illustrates a computing device 400 that is an example implementation of the example image processing configuration shown in FIG. 2. The computing device 400 includes the memory 206 in communication with the processor 204. The memory 206 stores multiple machine learning (ML) models 406, 408, and 410. In at least some embodiments, the computing device 400 receives image data 402 from a camera image sensor (e.g., first image sensor 201 or second image sensor 202) and point cloud data 404 from a LiDAR sensor (e.g., depth sensor 240). The ML model 406 (e.g., a transformer) is trained to separate the image data 402 into a plurality of patches. The ML model 406 may embed each of the patches with positional information. For example, a multi-head attention module 412 of the ML model 406 may apply multi-head attention to each of the patches to store positional information of the patches with respect to one another along with local feature importance values each of the patches that indicate an importance in identifying which patch affects the identification of other patches.

The ML model 408 (e.g., a transformer) is trained to extract features of the LiDAR point cloud data and extract features of the camera image data. A cross-attention module 414 of the ML model 408 is trained to execute a cross-attention process to match the extracted features of the image data with the extracted features of the point cloud data and thereby determine cross-attention features, which store information about surrounding features in the LiDAR point cloud data and their importance in the LiDAR point cloud space. An importance value (e.g., weighting value) is associated with each of the cross-attention features of the LiDAR point cloud data based on an overlap of a feature (e.g., patch) of the image data with the cross-attention features of the point cloud data, which is repeated for each feature of the image data. An output of the cross-attention process is (1) the importance values associated with the point cloud data, (2) extracted image data features, and (3) extracted point cloud data features. The ML model 408 is further trained to fuse the extracted camera image data features and the extracted point cloud data features in a common latent space, with the importance values associated with each of the cross-attention features of the LiDAR point cloud data, such that an output of the ML model 408 is (1) the importance values associated with the point cloud data and (2) fused image data that combines the extracted image data features and the extracted point cloud data features.

The ML model 410 receives the output of the ML model 408 as input and is trained to output a prediction 416 of whether the fused image data satisfies a criteria based on whether a population risk function of the ML model 408 exceeds a threshold. In at least some embodiments, the criteria is indicative of the fused image data including an irregularity indicative of at least one of the image data, the point cloud data, and the fused image data being altered, such as by an adversarial attack. The population risk function, in at least some aspects, includes artificial data noise and a sum of a first loss function of the image data and a second loss function of the point cloud data.

Figure 5:
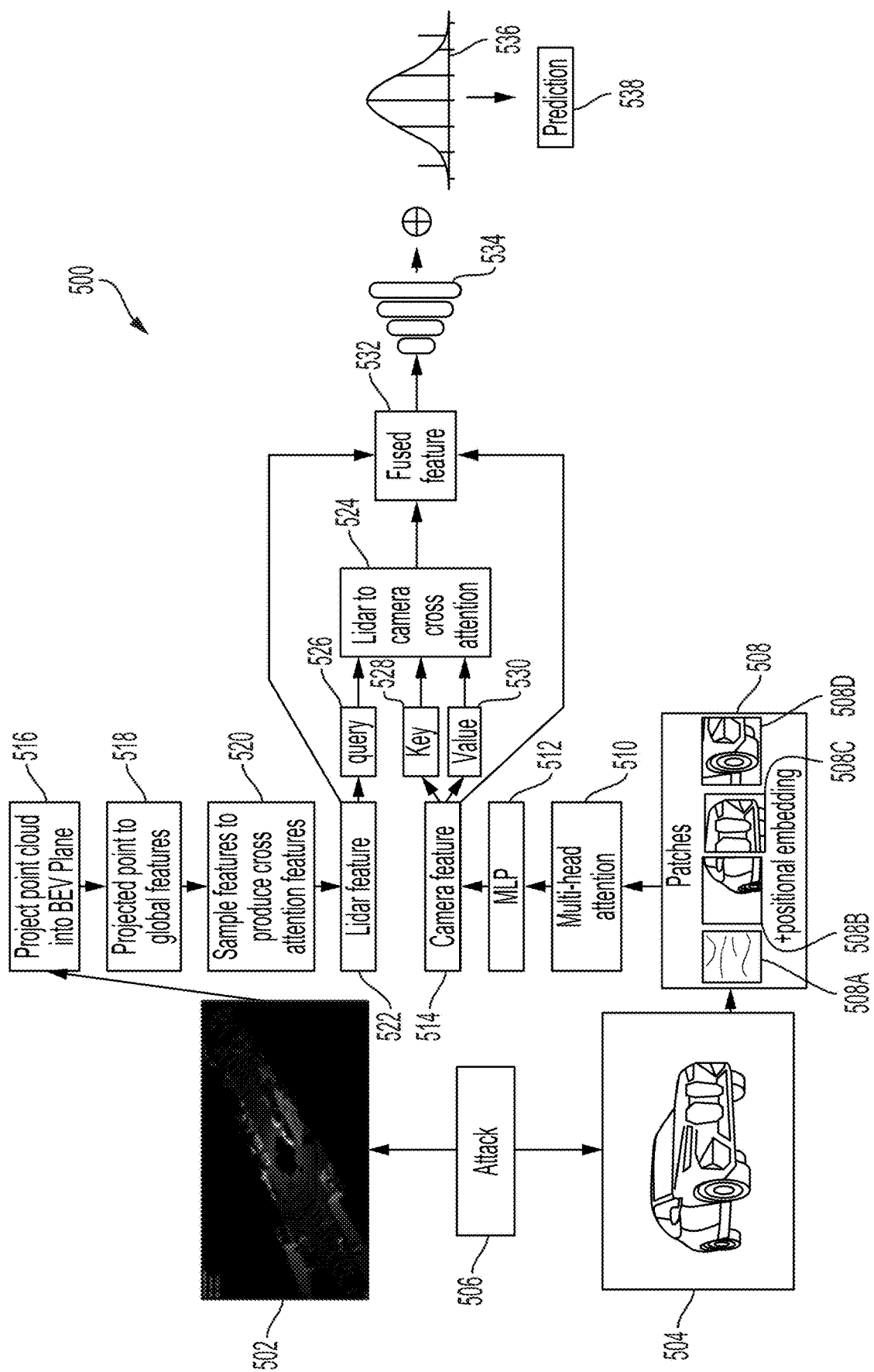
FIG. 5 is a flow diagram illustrating an example method for detecting and limiting or preventing adversarial attacks to a camera-LiDAR fusion system according to one or more aspects of the disclosure.

One method of performing image processing according to embodiments described above is shown in FIG. 5. FIG. 5 is a flow diagram illustrating an example method for detecting, or limiting the effectiveness of, an adversarial attack on a camera-LiDAR fusion system. A method 500 includes, at block 502, receiving point cloud data from a LiDAR sensor (e.g., depth sensor 240). At block 504, image data is received from a camera image sensor (e.g., image sensor 201 or 202). At block 506, an adversarial attack may alter the point cloud data, the image data, or both. At block 508, the image data may be separated into multiple patches (e.g., 256 patches). Each of the patches may be embedded with positional information. Visual representations of example patches 508A to 508D of the image data are shown in block 508. At block 510, multi-head attention may be applied to each of the patches to store positional information of the patches with respect to one another along with the local feature importance of each of the patches in identifying which patch affects the identification of other patches. At block 512, in this example, a multi-layer perceptron is used to extract features from the camera image data and determine camera feature tensors. The camera feature tensors are shown at block 514.

At block 516, the point cloud data may be projected into the Bird's Eye View (BEV) plane. At block 518, projected features of the point cloud data are obtained, which can be used to obtain index (e.g., global) features. At block 520, the index features can be used to obtain cross-attention features of the point cloud data, which store information about surrounding features in the point cloud data and their importance in the point cloud space. LiDAR feature tensors are shown at block 522.

At block 524, a cross-attention process is applied to the point cloud features of block 522 and the image data features of block 514. For example, the cross-attention process may be executed by a module of a first machine learning model. The cross-attention involves a query (block 526) from the LiDAR system for each of the point cloud data features and a key (block 528) and value (block 530) in response from the camera system to match the features of the point cloud data with the features of the patches of the image data. A local feature importance value (e.g., weighting value) is associated with each of the cross-attention features of the point cloud data based on an overlap of a feature of a patch of the image data with the cross-attention features of the point cloud data, which is repeated for each feature of each patch of the image data.

At block 532, the extracted features of the point cloud data are fused with the extracted features of the patches of the image data in a common latent space with the local feature importance values associated with the cross-attention features of the point cloud data to determine fused image data. For example, the first machine learning model may be trained to fuse the extracted features to determine the fused image data. At block 534, it is determined whether the fused image data has an irregularity (e.g., artificial data noise) indicative of the image data, the point cloud data, or the fused image data having been altered, such as by an adversarial attack. For example, if the image data, the point cloud data, or the fused image data was altered by an adversarial attack, then the fused image data may include artificial data noise (block 536). If an irregularity is detected in the fused image data, then, at block 538, the second machine learning model may predict that the fused image data is altered and unreliable. Alternatively, if an irregularity is not detected in the fused image data, then, at block 538, the second machine learning model may predict that the fused image data is free from alteration and reliable.

Figure 6:
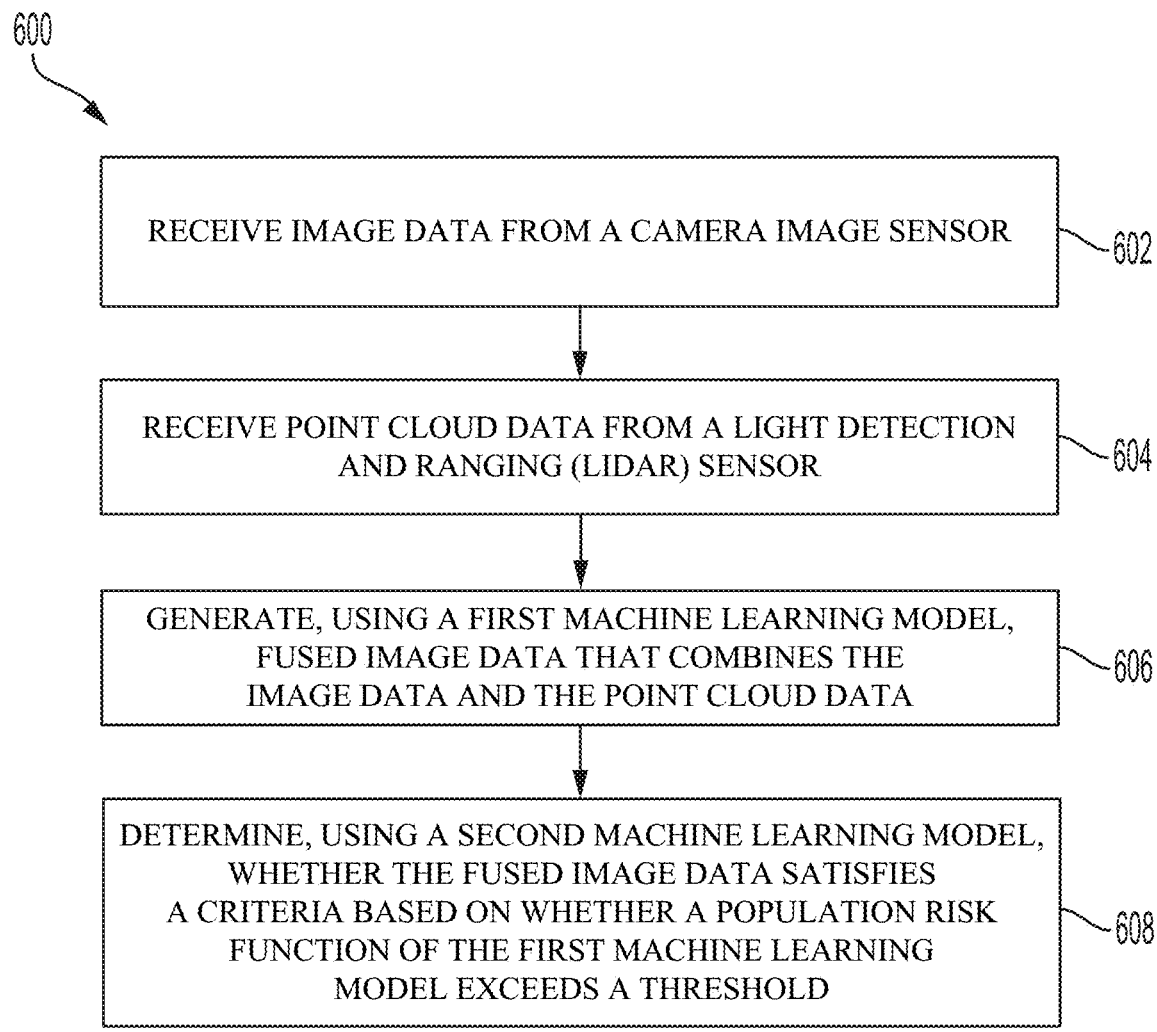
FIG. 6 is a flow chart illustrating an example method for detecting whether fused point cloud and image data has been compromised by an adversarial attack according to one or more aspects of the disclosure.

One method of performing image processing according to embodiments described above is shown in FIG. 6. FIG. 6 is a flow chart illustrating an example method for predicting (e.g., detecting) whether fused image data is compromised due to an adversarial attack, which may be either a white box attack or a black box attack. The fused image data combines image data with point cloud data. A method 600 includes, at block 602, receiving image data from a camera image sensor. In some embodiments, the method 600 includes separating the image data into a plurality of patches (e.g., 16×16 patches) prior to camera-LiDAR fusion. For example, a transformer (e.g., ML model 406) may be utilized to separate the image data into the plurality of patches. Each of the patches may be embedded with positional information. For example, multi-head attention may be applied by the transformer (e.g., multi-head attention module 412 of ML model 406) to each of the patches to store positional information of the patches with respect to one another along with each of the patches' local feature importance in identifying which patch affects the identification of other patches.

At block 604, point cloud data is received from a light detection and ranging (LiDAR) sensor. At block 606, fused image data that combines the image data and the point cloud data is determined using a first machine learning model (e.g., ML model 408). In various embodiments, the method 600 may include, extracting features of the LiDAR point cloud data and extracting features of the camera image data. For example, the ML model 408 may extract the features. The extracted features of each of the point cloud data and image data, instead of raw image data (e.g., image data 402) and raw point cloud data (e.g., point cloud data 404), may be fused in latent space by the ML model 408.

In various embodiments, fusing the extracted features involves a cross-attention process. For example, a cross-attention module 414 may execute the cross-attention process on the extracted features to match a plurality of portions of the image data with a plurality of portions of the point cloud data. The cross-attention process combines asymmetrically two separate embedding sequences of the same dimension. One of the sequences serves as a query input, while the other as a key and value inputs. In this example, the cross-attention process includes generating a query from the point cloud data and generating a key and a value from the image data based on the query. In an example, a 3D reference point of the LiDAR point cloud data may be projected into the Bird's Eye View (BEV) plane and projected features of the LiDAR point cloud data may be obtained, which can be used to obtain index features. The index features can be used to obtain cross-attention features, which store information about surrounding features in the LiDAR point cloud data and their local feature importance in the LiDAR point cloud space. A local feature importance value (e.g., weighting value) is associated with each of the cross-attention features of the LiDAR point cloud data based on an overlap of a feature (e.g., patch) of the image data with the cross-attention features of the point cloud data, which is repeated for each feature of the image data. An output of the cross-attention process is (1) the local feature importance values associated with the point cloud data, (2) the extracted image data features, and (3) the extracted point cloud data features. The extracted image data features and the extracted point cloud data features may be fused in a common latent space, with the importance values associated with each of the cross-attention features of the LiDAR point cloud data. An output of the ML model 408 is (1) the local feature importance values associated with the point cloud data and (2) fused image data that combines the extracted camera image data features and the extracted point cloud data features.

At block 608, it is determined, using a second machine learning model (e.g., ML model 410), whether the fused image data satisfies a criteria based on whether a population risk function of the ML model 408 exceeds a threshold. In at least some embodiments, the criteria is indicative of the fused image data including an irregularity indicative of the image data, the point cloud data, or the fused image data being altered, such as by an adversarial attack. In some embodiments, the output of the ML model 408 is input to the ML model 410. The population risk function, in at least some aspects, includes a sum of a first loss function of the image data and a second loss function of the point cloud data. Each of the first and second loss functions include a plurality of weights. In some aspects, artificial data noise, such as a distribution function, may be added to the weights of the first and second loss functions. An example population risk function is shown by Equation 1 below in which $\rho(\theta)$ is a population risk function, $\theta$ is a weight to which noise is added, $L_1(\theta_1 x+\delta, z_1)$ is a loss function of the image data, $L_2(\theta, y+\phi, z_2)$ is a loss function of the point cloud data, x is image data, $\delta$ is bias added to the image data, $z_1$ is an output of the loss function of the image data, y is point cloud data, $\phi$ is bias added to the point cloud data, $z_2$ is an output of the loss function of the point cloud data, S is the size of the permissible noise (e.g., perturbation), $E_{((x,y),z)\sim D}$ is a function that minimizes the maximum of the sum of the loss functions of the image data and the point cloud data, and D is a distance metric indicative of how far an output is from an original output and is minimized. The ML model 410 is trained to determine a range of artificial data noise that increases the population risk function. For instance, the model 410 is trained to determine the smallest change in noise that can cause the model 408 to predict incorrectly.

$$\rho(\theta)=E_{((x,y),z)\sim D}[\max_{\delta,\phi\in S} L_1(\theta,x+\delta,z_1)+L_2(\theta,y+\phi,z_2)] \quad (1)$$

In various embodiments, the method 600 includes disabling a function of a vehicle (e.g., autonomous vehicle) in response to the population risk function of the ML model 408 exceeding the threshold, which is indicative of the fused image data being unreliable such as due to an adversarial attack. For example, the autonomous vehicle's autopilot function may be disabled, thereby requiring human-operated driving, so that the unreliable fused image data does not cause the autonomous vehicle to drive into dangerous situations for the passengers in the autonomous vehicle or for individuals in vicinity of the autonomous vehicle.

Figure 7:
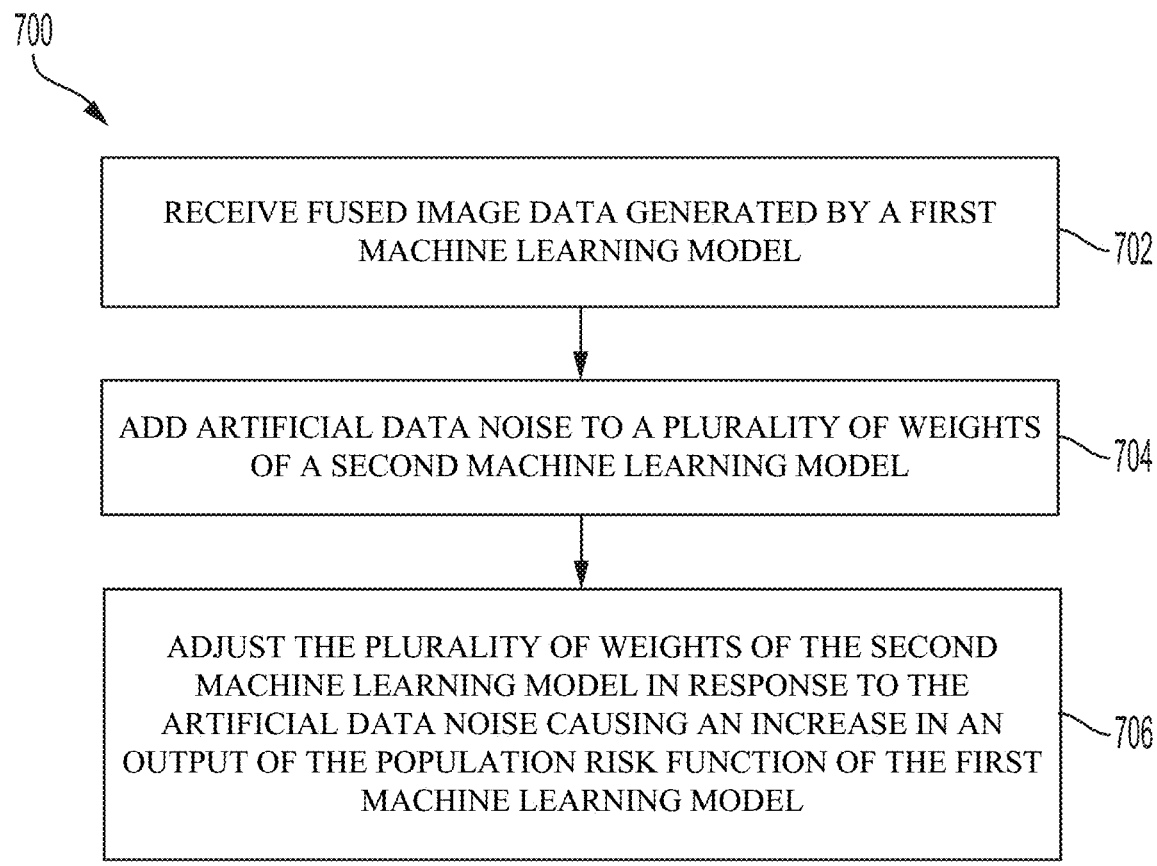
FIG. 7 is a flow chart illustrating an example method for training a machine learning model to detect artificial data noise associated with an adversarial attack according to one or more aspects of the disclosure.

One method of training a machine learning model according to embodiments described above is shown in FIG. 7. FIG. 7 is a flow chart illustrating an example method for training a machine learning model to predict whether input data has been altered at any point prior to the prediction stage, such as by an adversarial attack. A method 700 includes, at block 702, receiving fused image data determined by a first machine learning model (e.g., ML model 408). For example, the ML model 410 may receive the fused image data output by the ML model 408. The fused image data combines a first plurality of features of point cloud data and a second plurality of features of image data. In various embodiments, the ML model 410 further receives the local feature importance values associated with the point cloud data that are output by the ML model 408. In various aspects, the image data is separated into a plurality of patches, and the fused image data combines a first plurality of features of the plurality of patches of the image data and a second plurality of features of the point cloud data. In various aspects, each respective patch of the plurality of patches includes a respective local feature importance value that indicates an importance of the respective patch for identifying other patches of the plurality of patches. In some aspects, the first plurality of features of the point cloud data and the second plurality of features of the image data are fused using a cross-attention process. The cross-attention process may include generating a query from the point cloud data, and generating a key and a value from the image data based on the query.

At block 704, artificial data noise is added to a plurality of weights of a second machine learning model (e.g., ML model 410). The ML model 410 includes a population risk function of the ML model 408. For example, the noise is added to the weights θ of the population risk function of Equation 1. In some aspects, the artificial data noise that is added to the plurality of weights is a distribution function, such as a Gaussian distribution function.

At block 706, the plurality of weights of the ML model 410 are adjusted in response to the artificial data noise causing an increase in an output of the population risk function. Adjusting the plurality of weights of the ML model 410 trains the ML model 410 to minimize the population risk function when artificial data noise is added to the population risk function. In this way, the ML model 410 is trained to learn a range or ranges of artificial data noise that increases the population risk function and is/are therefore indicative of the fused image data including an irregularity indicative of at least one of the image data, the point cloud data, and the fused image data being altered. Stated differently, given inputs x (image data) and y (point cloud data), the population risk function determines a prediction z. An adversarial attack can be assumed during training by adding artificial data noise to the weights of the population risk function to create adversarial examples $x^{t+1}$ and $y^{t+1}$, and the ML model 410 is trained to learn the perturbation rate and gradient of the assumed adversarial attack. In this way, the ML model 410 is trained to predict (e.g., detect) an adversarial attack at the inference stage.

It is noted that one or more blocks (or operations) described with reference to FIGS. 4, 6 and 7 may be combined with one or more blocks (or operations) described with reference to another of the figures. For example, one or more blocks (or operations) of FIG. 6 or 7 may be combined with one or more blocks (or operations) of FIG. 1-4. As another example, one or more blocks associated with FIG. 6 or 7 may be combined with one or more blocks associated with FIG. 5. As another example, one or more blocks associated with FIG. 4 may be combined with one or more blocks associated with FIG. 2.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

In one or more aspects, techniques for supporting vehicular operations may include additional aspects, such as any single aspect or any combination of aspects described below or in connection with one or more other processes or devices described elsewhere herein. In a first aspect, an apparatus is configured to perform operations including receiving image data from a camera image sensor; receiving point cloud data from a light detection and ranging (LiDAR) sensor; generating, using a first machine learning model, fused image data that combines the image data and the point cloud data; and determining, using a second machine learning model, whether the fused image data satisfies a criteria based on whether a population risk function of the first machine learning model exceeds a threshold. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the population risk function includes artificial data noise and a sum of a first loss function of the image data and a second loss function of the point cloud data. The second machine learning model is trained to minimize the population risk function based on the artificial data noise.

In a third aspect, in combination with the second aspect, the artificial data noise is a distribution function.

In a fourth aspect, in combination with one or more of the first aspect through the third aspect, the criteria is indicative of the fused image data including an irregularity indicative of at least one of the image data, the point cloud data, and the fused image data being altered.

In a fifth aspect, in combination with one or more of the first aspect through the fourth aspect, the operations further include disabling a function of a vehicle in response to the population risk function of the second machine learning model exceeding the threshold.

In a sixth aspect, in combination with one or more of the first aspect through the fifth aspect, the operations further include separating the image data into a plurality of patches prior to generating the fused image data such that the fused image data combines the plurality of patches of the image data and the point cloud data.

In a seventh aspect, in combination with the sixth aspect, each respective patch of the plurality of patches is embedded with positional information associated with the respective patch.

In an eighth aspect, in combination with one or more of the first aspect through the seventh aspect, the operations further include generating a local feature importance value for each respective patch of the plurality of patches that indicates an importance of the respective patch for identifying other patches of the plurality of patches.

In a ninth aspect, in combination with one or more of the first aspect through the eighth aspect, the operations further include extracting a first set of features from the image data; and extracting a second set of features from the point cloud data, and generating the fused image data includes fusing the first and second sets of features.

In a tenth aspect, in combination with the ninth aspect, the first and second sets of features are fused using a cross-attention process that matches a plurality of portions of the image data with a plurality of portions of the point cloud data.

In an eleventh aspect, in combination with one or more of the first aspect through the tenth aspect, an apparatus is configured to perform operations for training a machine learning model for use in a vehicle assistance system. The operations include receiving fused image data determined by a first machine learning model, and adding artificial data noise to a plurality of weights of a second machine learning model. The fused image data combines a first plurality of features of point cloud data and a second plurality of features of image data. The second machine learning model includes a population risk function of the first machine learning model. The operations further include adjusting the plurality of weights of the second machine learning model in response to the artificial data noise causing an increase in an output of the population risk function of the first machine learning model, thereby training the second machine learning model to minimize the population risk function when the population risk function includes an artificial data noise.

In a twelfth aspect, in combination with the eleventh aspect, the image data is separated into a plurality of patches, and the fused image data combines a first plurality of features of the plurality of patches of the image data and a second plurality of features of the point cloud data.

In a thirteenth aspect, in combination with the twelfth aspect, each respective patch of the plurality of patches includes a respective local feature importance value that indicates an importance of the respective patch for identifying other patches of the plurality of patches.

In a fourteenth aspect, in combination with one or more of the first aspect through the thirteenth aspect, the artificial data noise is a Gaussian distribution function.

In a fifteenth aspect, in combination with one or more of the eleventh aspect through the fourteenth aspect, the first plurality of features of the point cloud data and the second plurality of features of the image data are fused using a cross-attention process. The cross-attention process includes generating a query from the point cloud data; and generating a key and a value from the image data based on the query.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for image processing for use in a vehicle assistance system, comprising:
   receiving, by a processor, image data from a camera image sensor;
   receiving, by the processor, point cloud data from a light detection and ranging (LiDAR) sensor;
   generating, by the processor and using a first machine learning model, fused image data that combines the image data and the point cloud data; and
   determining, by the processor and using a second machine learning model, whether the fused image data satisfies a criteria based on whether a population risk function of the first machine learning model exceeds a threshold.

2. The method of claim 1, wherein the population risk function includes artificial data noise and a sum of a first loss function of the image data and a second loss function of the point cloud data, and wherein the second machine learning model is trained to minimize the population risk function based on the artificial data noise.

3. The method of claim 2, wherein the artificial data noise is a distribution function.

4. The method of claim 1, wherein the criteria is indicative of the fused image data including an irregularity indicative of at least one of the image data, the point cloud data, and the fused image data being altered.

5. The method of claim 1, further comprising disabling, by the processor, a function of a vehicle in response to the population risk function of the second machine learning model exceeding the threshold.

6. The method of claim 1, further comprising separating, by the processor, the image data into a plurality of patches prior to generating the fused image data such that the fused image data combines the plurality of patches of the image data and the point cloud data.

7. The method of claim 6, wherein each respective patch of the plurality of patches is embedded with positional information associated with the respective patch.

8. The method of claim 7, further comprising generating, by the processor, a local feature importance value for each respective patch of the plurality of patches that indicates an importance of the respective patch for identifying other patches of the plurality of patches.

9. The method of claim 1, further comprising:
   extracting, by the processor, a first set of features from the image data; and
   extracting, by the processor, a second set of features from the point cloud data, and
   wherein generating the fused image data includes fusing, by the processor, the first and second sets of features.

10. The method of claim 9, wherein the first and second sets of features are fused using a cross-attention process that matches a plurality of portions of the image data with a plurality of portions of the point cloud data.

11. An apparatus, comprising:
    a memory storing processor-readable code; and
    at least one processor coupled to the memory, the at least one processor configured to execute the processor-readable code to cause the at least one processor to perform operations including:
    receiving image data from a camera image sensor;
    receiving point cloud data from a light detection and ranging (LiDAR) sensor;

generating, using a first machine learning model, fused image data that combines the image data and the point cloud data; and determining, using a second machine learning model, whether the fused image data satisfies a criteria based on whether a population risk function of the first machine learning model exceeds a threshold.

12. The apparatus of claim 11, wherein the population risk function includes artificial data noise and a sum of a first loss function of the image data and a second loss function of the point cloud data, and wherein the second machine learning model is trained to minimize the population risk function based on the artificial data noise.

13. The apparatus of claim 12, wherein the artificial data noise is a distribution function.

14. The apparatus of claim 12, wherein the criteria is indicative of the fused image data including an irregularity indicative of at least one of the image data, the point cloud data, and the fused image data being altered.

15. The apparatus of claim 11, wherein the operations further comprise disabling a function of a vehicle in response to the population risk function of the second machine learning model exceeding the threshold.

16. The apparatus of claim 11, wherein the operations further comprise separating the image data into a plurality of patches prior to generating the fused image data such that the fused image data combines the plurality of patches of the image data and the point cloud data.

17. The apparatus of claim 16, wherein each respective patch of the plurality of patches is embedded with positional information associated with the respective patch.

18. The apparatus of claim 17, wherein the operations further comprise
generating, by the processor, a local feature importance value for each respective patch of the plurality of patches that indicates an importance of the respective patch for identifying other patches of the plurality of patches.

19. The apparatus of claim 11, wherein the operations further comprise:
extracting a first set of features from the image data; and
extracting a second set of features from the point cloud data, and
wherein generating the fused image data includes fusing the first and second sets of features.

20. The apparatus of claim 19, wherein the first and second sets of features are fused using a cross-attention process that matches a plurality of portions of the image data with a plurality of portions of the point cloud data.

21. A method for training a machine learning model for use in a vehicle assistance system, comprising:
receiving, by a processor, fused image data determined by a first machine learning model, wherein the fused image data combines a first plurality of features of point cloud data and a second plurality of features of image data;
adding, by the processor, artificial data noise to a plurality of weights of a second machine learning model, wherein the second machine learning model includes a population risk function of the first machine learning model; and
adjusting, by the processor, the plurality of weights of the second machine learning model in response to the artificial data noise causing an increase in an output of the population risk function of the first machine learning model, thereby training the second machine learning model to minimize the population risk function when the population risk function includes an artificial data noise.

22. The method of claim 21, wherein the image data is separated into a plurality of patches, and wherein the fused image data combines a first plurality of features of the plurality of patches of the image data and a second plurality of features of the point cloud data.

23. The method of claim 22, wherein each respective patch of the plurality of patches includes a respective local feature importance value that indicates an importance of the respective patch for identifying other patches of the plurality of patches.

24. The method of claim 21, wherein the artificial data noise is a Gaussian distribution function.

25. The method of claim 21, wherein the first plurality of features of the point cloud data and the second plurality of features of the image data are fused using a cross-attention process comprising:
generating, by the processor, a query from the point cloud data; and
generating, by the processor, a key and a value from the image data based on the query.

26. An apparatus, comprising:
a memory storing processor-readable code; and
at least one processor coupled to the memory, the at least one processor configured to execute the processor-readable code to cause the at least one processor to perform operations including:
receiving fused image data determined by a first machine learning model, wherein the fused image data combines a first plurality of features of point cloud data and a second plurality of features of image data;
adding artificial data noise to a plurality of weights of a second machine learning model, wherein the second machine learning model includes a population risk function of the first machine learning model; and
adjusting the plurality of weights of the second machine learning model in response to the artificial data noise causing an increase in an output of the population risk function of the first machine learning model, thereby training the second machine learning model to minimize the population risk function when the population risk function includes an artificial data noise.

27. The apparatus of claim 26, wherein the image data is separated into a plurality of patches, and wherein the fused image data combines a first plurality of features of the plurality of patches of the image data and a second plurality of features of the point cloud data.

28. The apparatus of claim 27, wherein each respective patch of the plurality of patches includes a respective local feature importance value that indicates an importance of the respective patch for identifying other patches of the plurality of patches.

29. The apparatus of claim 26, wherein the artificial data noise is a Gaussian distribution function.

30. The apparatus of claim 26, wherein the first plurality of features of the point cloud data and the second plurality of features of the image data are fused using a cross-attention process comprising:
generating a query from the point cloud data; and
generating a key and a value from the image data based on the query.

* * * * *